United States Patent [19]
Nakaya et al.

[11] 4,217,330
[45] Aug. 12, 1980

[54] APPARATUS FOR PRODUCTION OF SODIUM BICARBONATE

[75] Inventors: Keiichi Nakaya, Chiba; Kimihiko Sato, Yokohama; Kenji Konishi, Ichihara, all of Japan

[73] Assignee: Asahi Glass Company, Limited, Tokyo, Japan

[21] Appl. No.: 613,439

[22] Filed: Sep. 15, 1975

[30] Foreign Application Priority Data

Sep. 13, 1974 [JP] Japan ................................. 49-104881

[51] Int. Cl.$^2$ ............................................. B01J 10/00
[52] U.S. Cl. ..................................... 422/193; 261/77; 261/123; 422/231; 422/245; 423/422
[58] Field of Search ...................... 23/283, 285, 273 R, 23/284; 423/422; 261/123, 114 R, 77; 422/193, 230, 231, 245

[56] References Cited

U.S. PATENT DOCUMENTS

| | | | |
|---|---|---|---|
| 2,784,056 | 3/1957 | Wiseman | 423/422 X |
| 2,983,578 | 5/1961 | Gunderson et al. | 23/283 X |
| 3,102,787 | 9/1963 | McMillan et al. | 23/285 X |
| 3,124,518 | 3/1964 | Guzman et al. | 23/288 E X |
| 3,193,361 | 7/1965 | Niedner | 23/273 R X |
| 3,495,952 | 2/1970 | Ulbrecht et al. | 23/284 X |
| 3,511,615 | 5/1970 | Roget et al. | 23/283 |
| 3,617,033 | 11/1971 | Ichikawa et al. | 23/284 X |
| 3,752,885 | 8/1973 | Liebert et al. | 23/283 UX |
| 3,759,669 | 9/1973 | Aaron et al. | 23/285 X |

*Primary Examiner*—Arnold Turk
*Attorney, Agent, or Firm*—Oblon, Fisher, Spivak, McClelland & Maier

[57] ABSTRACT

Sodium bicarbonate is produced in an apparatus comprising a reactor system for the production of sodium bicarbonate which comprises a housing having a plurality of reaction zones being placed in sequence from a last zone to a first zone, each being in liquid and gas flow communication with each adjacent zone; carbon dioxide inlet means being disposed at the bottom of the last zone so that carbon dioxide introduced into said last zone moves upwardly through said zone, and is discharged through a gas-liquid separator at the top of said zone and is then introduced into the bottom of the next adjacent zone, until said gas reaches the top of the first zone where it is discharged through a carbon dioxide gas outlet; inlet means for feeding an ammoniacal brine or a mother liquor to be carbonated into the top of the first zone, counter-currently to the upward movement of the carbon dioxide gas in said first zone, wherein said brine or mother liquor is passed downwardly through said first zone and flows sequentially into each of said adjacent zones in countercurrent contact with the upward moving $CO_2$ in each of said zones; recirculation means being associated with each zone which directs the downward flow of liquid within said zone, said means having a liquid inlet situated at the top of said zone and a liquid outlet at the bottom of said zone; $CO_2$ sparger means situated at the bottom of each zone through which $CO_2$ is introduced into each zone at sufficient force such that a portion of the liquid within said zone is forced upwardly into proximity of the inlet to the recirculation means so that a portion of the liquid is continually introduced into said recirculation means; a gas-liquid separator disposed between each of said adjacent zones which prevents the upwardly forced liquid from re-entering the preceding zone by redirecting said upwardly forced liquid back to said zone, and which permits the unabsorbed $CO_2$ to be removed from said zone; means for introducing said $CO_2$ discharged from said gas-liquid separator into the next adjacent zone; and product outlet means disposed in proximity to the bottom of said last zone for recovery of the crystallized sodium bicarbonate-containing slurry.

4 Claims, 2 Drawing Figures

APPARATUS FOR PRODUCTION OF SODIUM BICARBONATE

BACKGROUND OF THE INVENTION

1. Field of the Invention

The present invention relates to apparatus useful for the production of sodium bicarbonate. More particularly, it relates to apparatus for production of sodium bicarbonate which has a simple structure and can be easily operated, and which possesses the advantages that it can be operated in a manner such that the coefficient for absorption of carbon dioxide gas is relatively high and so that the sodium bicarbonate crystals produced will have very desirable particle size.

2. Description of the Prior Art

Heretofore, a Solvay tower has been used in the ammonia soda process for crystallization of sodium bicarbonate, wherein ammonia is absorbed in a brine to obtain an ammoniacal brine and sodium bicarbonate is produced by reacting carbon dioxide gas with the ammoniacal brine. Alternatively, the tower is used in a process for coproduction of ammonium chloride and sodium bicarbonate wherein ammonia and sodium chloride are added to a mother liquor which has been produced by separating sodium bicarbonate crystals therefrom. Ammonium chloride then is crystallized and carbon dioxide gas is absorbed in the mother liquor produced by separating the resultant ammonium chloride resulting in crystallization of sodium bicarbonate.

The Solvay tower comprises many reaction zones which are vertically assembled. Each reaction zone has many partitions, each of which has its perforations covered with a cap so as to prevent free passage of carbon dioxide gas and to ensure good contact of the carbon dioxide gas with the mother liquor produced by the precipitating ammonium chloride (hereinafter referred to as the separated mother liquor).

The separated mother liquor is fed into the top of the tower and carbon dioxide gas is fed from the bottom of the tower, whereby the separated mother liquor is counter-currently contacted with carbon dioxide gas to crystallize sodium bicarbonate. In this manner of production of sodium bicarbonate, the size of the resultant sodium bicarbonate crystals increases with rising temperature. On the other hand, it is preferred to use lower temperatures in order to increase the coefficient for absorption of carbon dioxide in the reaction. Accordingly, in order to produce large sodium bicarbonate crystals, the separated mother liquor should be fed into the Solvay tower at a relatively high temperature. However, the separated mother liquor fed into the tower reacts with carbon dioxide gas while descending. As a result, the heat of the ensuing reaction causes the temperature of the gas to rise whereby the growth of sodium bicarbonate crystals is improved but the coefficient for absorption of carbon dioxide gas in the reaction is decreased. Consequently, many cooling tubes for controlling the temperature are generally assembled near the bottom of the tower whereby the temperature in the tower can be controlled below a predetermined temperature. Unfortunately, a scale consisting of a large amount of sodium bicarbonate crystals adheres to the cap used on the perforations, to the inner wall of the tower and to the outer wall of the cooling tubes so as to clog up the inner part of the tower. This disadvantageous phenomenon cannot be prevented. As a result, in industrial operation, several Solvay towers are required so that they may be alternated in use for removing the scale. Heretofore, this has been a practical necessity, making the operation complicated. Also, the apparatus has a complicated structure and it is correspondingly expensive. Moreover, when a large Solvay tower is designed to increase the production for a single tower, a large amount of additional equipment such as cooling apparatus, is required, further disadvantageously increasing the cost. Consequently, there continues to exist a need for a new apparatus for production of sodium bicarbonate which is free from these disadvantages.

SUMMARY OF THE INVENTION

Accordingly, it is an object of the present invention to provide an apparatus for production of sodium bicarbonate which results in a high coefficient for absorption of carbon dioxide in the reaction used, which enables production of large crystals of sodium bicarbonate and which increases the efficiency of use of the carbon dioxide.

Briefly, this and other objects of this invention, as will hereinafter become clear from the ensuing discussion, have been attained by providing an apparatus which comprises plural zones and a gas-liquid separator for separating a carbon dioxide-containing gas from a suspension disposed between the reaction zones, wherein a mother liquor separated from crystallized ammonium chloride or an ammoniacal brine is moved from the first reaction zone to the following reaction zones, at the same time the carbon dioxide-containing gas is fed from the bottom of the last reaction zone from where it rises through the reaction zone, thereby the emanating gas is separated from the resultant suspension at the gas-liquid separator between the last zone and the preceding one, and the separated carbon dioxide-containing gas is fed to the bottom of the preceding reaction zone, thereby counter-currently contacting the carbon dioxide-containing gas with the mother liquor or the ammoniacal brine in each zone to react them while said liquor or brine is being recirculated by the gas lifting action of the gas in a recirculation means of each reaction zone.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DESCRIPTION OF THE PREFERRED EMBODIMENTS

Figure 1:
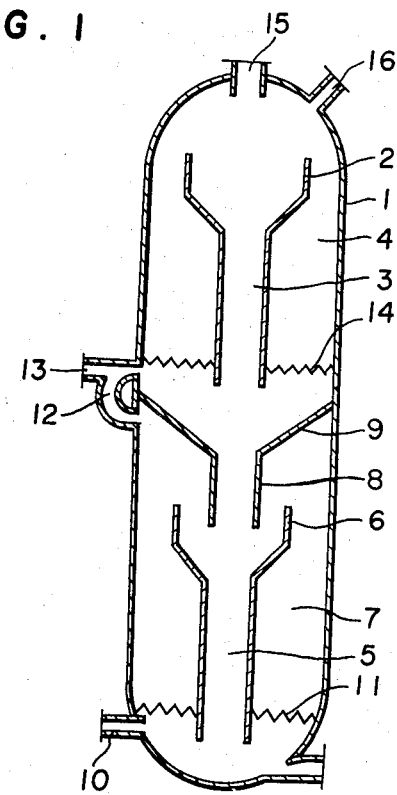
FIGS. 1 and 2 are respectively sectional views of embodiments of an apparatus according to this invention.

In designing the apparatus of this invention, one goal was to avoid the various disadvantages of the conventional Solvay tower, i.e., to eliminate the complicated structure of the tower; to impart a high coefficient of absorption of carbon dioxide gas in the reaction; and to produce large sodium bicarbonate crystals, even without the use of cooling tubes. This invention succeeds in that goal and the resulting design achieves the following:

(1) The design enables the running of the reaction at a relatively low temperature, in which the coefficient of absorption of carbon dioxide gas is increased.

(2) Nevertheless, the resulting sodium bicarbonate crystals are relatively large.

(3) The present apparatus enables the large amount of carbon dioxide gas required for the production of sodium bicarbonate to be utilized efficiently by permitting an increase in the absorption coefficient of the carbon dioxide gas.

It has been found that the growth of large sodium bicarbonate crystals can be attained by conducting the reaction with absorption of carbon dioxide gas at a relatively low temperature by recirculation of the suspension with seed crystals using the resulting sodium bicarbonate crystals. One advantage of this technique is that the seemingly conflicting requirements of (1) and (2) can be attained. It has also been found that it is possible to feed a desirable concentration of carbon dioxide gas in each of the steps by conducting the reaction with absorption of carbon dioxide gas separately in each of a plurality of steps. One consideration (3, above) can be attained thereby. In this apparatus, a stirring means can be used to enable the forcible recirculation system. Absorption of carbon dioxide would thus occur with recirculation of the solution in the presence of seed crystals. However, the quantity of the resulting sodium bicarbonate crystals required is too great and high cost for power is a problem. Furthermore, the growth of the crystals of sodium bicarbonate would be adversely disturbed by the action of the stirrer blades, which would tend to cut the crystals of sodium bicarbonate. Accordingly, the inventors have developed a recirculation system which utilizes a recirculation which relies on differences in the specific gravities of the components of the suspension.

In the apparatus of this invention, at least two reaction zones are provided. A gas containing a high concentration of carbon dioxide is fed from the bottom of the lowest reaction zone and thereafter, the gas rising through the reaction zone is used to carbonate a mother liquor or ammoniacal brine. The gas containing a low concentration of unreacted carbon dioxide, is fed into the upper reaction zone which contains a liquor having a lower degree of carbonation. In this manner, the coefficient for utilizing carbon dioxide gas is increased. In each of the reaction zones, recirculation of the liquor is effected by a gas-lifting action caused by the carbon dioxide-containing gas feed. The already-crystallized sodium bicarbonate provides seed crystals whereby the growth of the sodium bicarbonate crystals can be attained by reaction of the carbon dioxide gas with the separated mother liquor or the ammoniacal brine being recirculated, so as to obtain desirably sized sodium bicarbonate crystals. Accordingly, the temperature of the separated mother liquor or the ammoniacal brine has a greatly lessened effect on the size of the sodium bicarbonate crystals as compared with the conventional Solvay tower processes. The separated mother liquor or the ammoniacal brine having a correspondingly lower temperature can be fed as compared with the temperature used in the conventional Solvay tower, whereby the cooling equipment needed in the apparatus can be decreased. In some cases, it is possible to totally eliminate the outer cooling of the apparatus.

Referring to the drawings, certain embodiments of the apparatus of this invention will be illustrated.

In FIG. 1, the body (1) of the apparatus is equipped with a pipe (3) having an upper enlarged opening (2) to form the first reaction zone (4). A pipe (5) has an upper enlarged opening (6), which is coaxially disposed relative to the pipe (3) and below the pipe (3) forming the second reaction zone (7). Between the first reaction zone (4) and the second reaction zone (7), a funnel shaped element (8) is disposed so as to contact the edge of the enlarged part (9) of element (8) with the inner wall of the apparatus and to dispose the pipe of the funnel shaped element (8) toward the second reaction zone (7). The funnel shaped element (8) is used as a partition between the first reaction zone (4) and the second reaction zone (7) and is also used as a separator for separating the carbon dioxide-containing gas from the suspension in the second reaction zone. The first reaction zone (4) communicates with the second reaction zone (7) by the pipe of the funnel shaped element (8). An inlet (10) for the carbon dioxide-containing gas is disposed at the bottom of the apparatus, and a gas distributing plate (11) having annular shape with many fine apertures or slits satisfactorily distributes the carbon dioxide-containing gas into the second reaction zone. A gas pipe (12) feeds the carbon dioxide-containing gas separated from the second reaction zone (7) to the first reaction zone (4), and an inlet (13) for carbon dioxide-containing gas is provided in conjunction with the gas pipe (12) for feeding any new carbon dioxide gas required. A gas distributing plate (14) distributes the gas into the first reaction zone (4) and is similar to plate (11) of the second reaction zone. An inlet (15) for the separated mother liquor or the ammoniacal brine is provided at the upper part of the apparatus and an outlet (16) is for the exhaust gas containing the unreacted carbon dioxide.

In the apparatus having the above-mentioned structure, the separated mother liquor or the ammoniacal brine is fed from the inlet (15) and the gas containing a high concentration of carbon dioxide generated by calcining sodium bicarbonate or the like is fed from the inlet (10). The carbon dioxide-containing gas reacts while rising in the second reaction reaction zone (7) thereby decreasing the concentration of carbon dioxide in the gas. The remaining gas is separated in the gas-liquid separator and is fed from the second reaction zone (7) through the gas pipe (12) to the first reaction zone (4) and is distributed by the gas distributing plate (14). The separated mother liquor or the ammoniacal brine is buoyed up by the gas lifting action of the carbon dioxide-containing gas around the pipe (3) and, when the level reaches the enlarged opening (2), it returns down through the pipe (3). Thereafter, it is again buoyed up by the gas lifting action around the pipe (3) so as to cause it to recirculate in the first reaction zone while reacting with carbon dioxide gas. A portion of the sodium bicarbonate crystals already formed act as seed crystals whereby some growth of sodium bicarbonate crystals is effected during the recirculation. However, in the first stage, the concentration of carbon dioxide is low, whereby sodium bicarbonate crystals are formed at a slow rate. Since the degree of carbonation of the solution fed into the first reaction zone is low, it is possible to satisfactorily conduct the reaction with a gas containing a relatively low concentration. Accordingly, it is possible to use as a feed, the exhaust gas containing a relatively low concentration of carbon dioxide gas which is discharged from the second reaction zone. Furthermore, it is possible to feed a second carbon dioxide-containing gas or an inert gas from the gas inlet (13) in order to impart suitable gas lifting action and suitable pressure required for carbon dioxide absorption in the first reaction zone. The suspension containing sodium bicarbonate crystals formed by the carbonation in the first reaction zone (for example, about 80% of conversion) is then fed through the funnel shaped element (8) to the second reaction zone (7).

In the second reaction zone (7), the carbonation is conducted further with a gas containing a high concentration of carbon dioxide which is fed into the apparatus from the inlet (10). One such suitable gas is that discharged from a furnace for calcining sodium bicarbonate. The reaction is not satisfactorily conducted if the concentration of carbon dioxide feed in the second reaction zone (7) is low because the degree of carbonation of the suspension feed into the second reaction zone is increased by the reaction in the first reaction zone. The reactions of carbon dioxide with the separated mother liquor or the ammoniacal brine in the first and second reaction zones are conducted during the time the carbon dioxide gas rises around the pipe (3) and the pipe (5). The gas is separated from the suspension at the enlarged openings (2) and (6) which are respectively disposed at the upper parts of the pipe (3) or the pipe (5). The suspensions containing the sodium bicarbonate slurry having a high specific gravity respectively flow down through the pipe (3) or the pipe (5). Thus, the suspension containing sodium bicarbonate slurry can be continuously recirculated without using a stirrer by utilizing the difference in the specific gravities of the suspension going into and out of each pipe, whereby the reaction is effected and the growth of sodium bicarbonate crystals is attained. Since no stirrer is used, the sodium bicarbonate crystals are not broken.

In FIG. 1, an enlarged opening is formed at the upper part of each of the pipes (3) and (5). However, other embodiments do exist. It is possible to form the thinner end at the upper part of each of the pipes (3) and (5), so as to cause the carbon dioxide-containing gas to rise in each of the pipes (3) and (5) causing reaction in the pipes (3) and (5). The suspensions containing sodium bicarbonate slurry flow down around each of the pipes (3) and (5), to cause an inner recirculation. In this latter case, the inner parts of the pipes (3) and (5) are the reaction zones. Accordingly, it is necessary to provide sufficient volume in the pipe. However, when the volume of the reaction zones and of the outer diameter of the apparatus are about the same, the gap between the outer wall of the pipes and the inner wall of the apparatus is narrow. The sodium bicarbonate slurry crystallized in the pipes flows down through this gap and adheres to the outer walls of the pipes and the inner wall of the apparatus as a rule, to prevent smooth recirculation in the reaction. In order to prevent this disadvantage, the outer diameter of the apparatus should be increased. But this is also disadvantageous as compared with the structure of the former case having the enlarged opening at the top. It has also been considered that the carbon dioxide containing gas can be fed from the bottom of each of the pipes (3) and (5) allowing it to rise through the inner parts of the pipes and the suspension to flow down from the upper parts of the pipes. However, the amount of carbon dioxide-containing gas fed in the production of sodium bicarbonate is quite voluminous. Accordingly, only the gas rises in the pipes causing the phenomenon of gas flowing preventing both a smooth reaction and the recirculation of the suspension. The smooth feed of the carbon dioxide containing gas is prevented because a large amount of sodium bicarbonate slurry is produced in the pipes.

Figure 2:
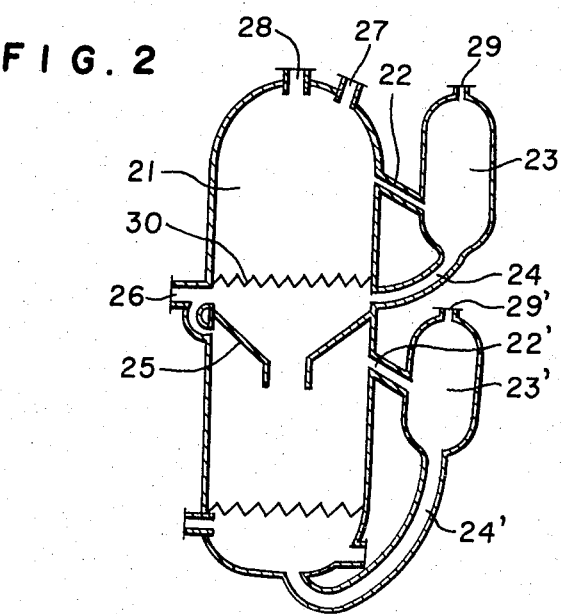

In the above embodiments, an inner recirculation system for the reaction zones has been illustrated. The invention is not limited to such a system and it is possible to use an outer recirculation system for the reaction zones. One embodiment of the outer recirculation system is shown in FIG. 2. The body (21) of the apparatus is equipped with an outlet pipe (22) near the upper surface of the suspension in the reaction zone. The outlet pipe (22) is connected to a gas-liquid separator (23), which has a desirable diameter and volume. The pipe (24) connected to the lower part of the gas-liquid separator (23), is connected to the side wall of the body (21) of the apparatus so as to recirculate the suspension along the upper part of the funnel shaped element (25) which is similar to the element of FIG. 1 disposed in the lower part of the reaction zone. An inlet (26) is for the carbon dioxide-containing gas; an inlet (27) is for the separated mother liquor or the ammoniacal brine; an outlet (28) is for the exhaust gas from the reaction; an outlet (29) is for the separated gas; and a gas distributing plate (30) is for distributing the carbon dioxide-containing gas feed.

In the apparatus, the separated mother liquor or the ammoniacal brine flows upwards by the gas lifting action during reaction with the carbon dioxide fed into the body of the apparatus. The reaction mixture is discharged through the outlet pipe (22) to the gas-liquid separator (23) wherein the gas is separated from the suspension yielding a high specific gravity fluid and the suspension is returned to the reaction zone along the upper part of the funnel shaped element (25) forming a recirculation flow. The growth of sodium bicarbonate crystals can be attained by this recirculating flow. In FIG. 2, the end of the pipe (24) connected to the lower part of the gas-liquid separator (23) can be extended into the body (21) of the apparatus through the side wall to open at about the central part of the funnel shaped element (25) below the gas distributing plate (30). It is also possible to extend the end of the pipe (24) from the lower part of the funnel shaped element (25) forward upwardly to the slant surface of the funnel shaped element (25). Other configurations are possible. It is also possible to enlarge a part of the upper part of the body (21) of the apparatus of the invention to form the gas-liquid separator (23) instead of using the outlet pipe (22).

In the apparatus of this invention, it is possible to employ only an inner recirculation system, only an outer recirculation system, or a combination of both systems. In any event, a highly efficient mixing system is employed in each of the reaction zones, whereby the size of the sodium bicarbonate crystals is not substantially affected by the temperature of the separated mother liquor or the ammoniacal brine fed into the Solvay tower. This is quite different from the situation in the conventional Solvay tower. Even if the temperature of the separated mother liquor or the ammoniacal brine is too low to attain the reaction by the conventional Solvay tower, the temperature rises by the reaction with the carbon dioxide in the apparatus of this invention. Moreover, the temperature at the reaction zone is uniform and the growth of sodium bicarbonate crystals can be attained by the reaction during recirculation. If desirable, it is also possible to dispose a cooler for controlling the rise of the temperature caused by the heat of reaction. In this case, it is possible to cool a part of the suspension discharged from the reaction zone by conventional techniques and to return it to the reaction zone.

In the discussed embodiments, only two reaction zones are provided. The invention is not limited to two reaction zones, and one or more reaction zones having similar structures can be inserted between the first reaction zone and the last reaction zone. It is also possible to horizontally assemble the reaction zones. All other conditions of the operation of the apparatus not discussed above can be determined by well-known conventional considerations, e.g., as discussed in "Encyclopedia of Chemical Technology", Second Edition, Vol. 1, pages 734–739 (Kirk-Othmer), wherein details of the Solvay process are illustrated.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A reactor for the production of sodium bicarbonate, which comprises:
    a housing having a plurality of reaction zones in vertical alignment being placed in vertical sequence from a last zone to a first zone, each being in liquid and gas flow communication with each adjacent zone;
    gas-liquid separator means between each of said sequential reaction zones in said housing for collecting the gas which is unabsorbed by the liquid in each zone;
    carbon dioxide inlet means being disposed at the bottom of the last zone so that carbon dioxide introduced into said last zone rises through the liquid in said last zone and the carbon dioxide which is unabsorbed in said last zone is then collected by said gas-liquid separator means at the top of said zone and reintroduced into the next adjacent zone;
    means for reintroducing said carbon dioxide collected by said gas-liquid separator means through said housing into the base of the next adjacent zone such that the combined functions of said gas-liquid separator and carbon dioxide reintroducing means in each zone results in the passage of unabsorbed carbon dioxide gas through said housing where it is discharged through a carbon dioxide gas outlet;
    inlet means for feeding an ammoniacal brine or a mother liquor to be carbonated into the top of the first zone, countercurrently to the upper movement of the carbon dioxide gas in said first zone, wherein said brine or mother liquor is passed downwardly through said first zone and continues by force of gravity to pass sequentially downward into each successive zone to effect countercurrent contact with the upper rising carbon dioxide in each of said zones;
    recirculation means within said housing being associated with each zone, said recirculation means having a liquid inlet situated at the top of said zone and a liquid outlet at the bottom of said zone, which confines the gravity controlled downward flow of liquid to the portion of the zone traversing the recirculation means;
    carbon dioxide sparger means situated at the bottom of each zone through which carbon dioxide, which has been admitted into the bottom of each zone from said carbon dioxide reintroduction means, is introduced into each zone at sufficient force such that a portion of the liquid within said zone is forced upwardly into proximity of the inlet to the recirculation means so that a portion of the liquid is continually introduced into said recirculation means, wherein said gas-liquid separator disposed between each of said adjacent zones prevents the upwardly forced liquid from reentering the preceeding zone by directing said upwardly forced liquid back to said zone; and
    product outlet means disposed in proximity to the bottom of said last zone for recovery of crystallized sodium bicarbonate-containing slurry; wherein said recirculation means, being associated with each zone, comprises a pipe with an enlarged inlet opening at one end and a thinner outlet opening at an opposite end and wherein said carbon dioxide sparger means includes an annular gas distributing plate, having fine holes or slits, interconnecting said recirculation means and said housing for distributing gas in said zones.

2. The apparatus of claim 1, wherein said gas-liquid separator is a funnel shaped element connected to said housing.

3. The apparatus of claim 1, wherein said means for reintroducing carbon dioxide from said gas-liquid separator is provided with means for introducing supplemental carbon dioxide containing gas into the bottom of each zone.

4. The apparatus of claim 1, wherein said plurality of reaction zones in said housing is two reaction zones.

* * * * *